(12) United States Patent
Tohta et al.

(10) Patent No.: US 6,991,513 B2
(45) Date of Patent: Jan. 31, 2006

(54) MAGNETIC HEAD GRINDING DEVICE AND METHOD

(75) Inventors: Kazushige Tohta, Tokyo (JP); Hiroshi Shindo, Tokyo (JP); Akio Ogawa, Tokyo (JP); Osamu Fukuroi, Tokyo (JP); Takashi Fujii, Tokyo (JP)

(73) Assignee: TDK Corporation, Tokyo (JP)

( * ) Notice: Subject to any disclaimer, the term of this patent is extended or adjusted under 35 U.S.C. 154(b) by 263 days.

(21) Appl. No.: 10/311,207

(22) PCT Filed: Jun. 15, 2001

(86) PCT No.: PCT/JP01/05122

§ 371 (c)(1),
(2), (4) Date: Jan. 16, 2003

(87) PCT Pub. No.: WO01/96063

PCT Pub. Date: Dec. 20, 2001

(65) Prior Publication Data

US 2003/0162480 A1    Aug. 28, 2003

(30) Foreign Application Priority Data

Jun. 16, 2000  (JP)  .............................. 2000-181336
Jun. 14, 2001  (JP)  .............................. 2001-179865

(51) Int. Cl.
*B24B 49/00*   (2006.01)
(52) U.S. Cl. .............................. 451/5; 451/11; 451/259
(58) Field of Classification Search .................... 451/5, 451/11, 24, 28, 55, 259, 364
See application file for complete search history.

(56) References Cited

U.S. PATENT DOCUMENTS

| 4,689,877 A | 9/1987 | Church |
| 4,914,868 A * | 4/1990 | Church et al. .................. 451/5 |
| 5,065,483 A | 11/1991 | Zammit |
| 5,203,119 A * | 4/1993 | Cole ........................... 451/11 |
| 5,210,667 A | 5/1993 | Zammit |
| 5,620,356 A | 4/1997 | Lackey et al. |
| 5,993,290 A | 11/1999 | Yoshihara et al. |

(Continued)

FOREIGN PATENT DOCUMENTS

| JP | 60-76011 | 4/1985 |
| JP | 2-95572 | 4/1990 |

(Continued)

*Primary Examiner*—David B. Thomas
(74) *Attorney, Agent, or Firm*—Oblon, Spivak, McClelland, Maier & Neustadt, P.C.

(57) ABSTRACT

The present invention relates to a lapping apparatus and a lapping method that may effect further machining in response to each element on a ceramic bar to the ceramic bar that is largely locally lapped and may reduce a cost needed for machining without any jig for holding the ceramic bar. The ceramic bar is held by a surface of an elastic member made of rubber or the like. A plurality of actuators are arranged on a back surface of this elastic member. When the ceramic bar is depressed against the lapping surface, a specific portion of the ceramic bar is deformed or strongly deformed through the elastic member by these actuators to thereby make it possible to perform the lapping in response to each element.

19 Claims, 14 Drawing Sheets

U.S. PATENT DOCUMENTS

| | | | |
|---|---|---|---|
| 6,045,431 A * | 4/2000 | Cheprasov et al. | 451/5 |
| 6,095,895 A * | 8/2000 | Fujita et al. | 451/5 |
| 6,174,218 B1 * | 1/2001 | Church et al. | 451/5 |
| 6,217,425 B1 * | 4/2001 | Shindou et al. | 451/259 |
| 6,447,367 B1 * | 9/2002 | Kozu et al. | 451/5 |
| 6,722,947 B2 * | 4/2004 | Nishioka et al. | 451/10 |

FOREIGN PATENT DOCUMENTS

| | | |
|---|---|---|
| JP | 5-44085 | 7/1993 |
| JP | 7-112672 | 6/1995 |
| JP | 8-7231 | 1/1996 |
| JP | 11-16124 | 1/1999 |
| JP | 2000-67414 | 3/2000 |
| JP | 2000-153452 | 6/2000 |
| JP | 2001-30157 | 2/2001 |
| JP | 2001-121394 | 5/2001 |
| JP | 2001-219359 | 8/2001 |
| JP | 2001-236621 | 8/2001 |

* cited by examiner

MAGNETIC HEAD GRINDING DEVICE AND METHOD

TECHNICAL FIELD

The present invention relates to a lapping apparatus and a lapping method for a magnetic head for lapping an object to be lapped in which magnetic-electric converting elements or the like for constituting the magnetic head are arranged in a plurality of rows, and more particularly to an apparatus and a method used in performing crown machining to a lapped surface of an object to be polished.

BACKGROUND ART

A thin film magnetic head used in a magnetic disc apparatus or the like is constituted by parts obtained by machining a bar-like ceramic (hereinafter, referred to as a ceramic bar) on the surface of which a number of element portions made of magnetic thin film or the like for constituting an inductive magnetic converting element or a magnetic resistor element (hereinafter, referred to as an MR element) or the like are formed in a row. A number of the element portions are initially simultaneously formed on a wafer-like ceramic substrate. This ceramic substrate is cut in one direction into a bar-shape to obtain the above-described ceramic bar.

A number of these element portions are simultaneously formed in the wafer-ceramic substrate by using machining technology and thin film technology that are represented by semiconductor manufacturing technology. In this process, for the respective thin films as for measuring a magnetic resistance, a magnetic pole, a coil, insulation or the like, film formation, photoresist coating, exposure for wiring shape or the like, removing no-exposed photoresist, etching of film in no-exposed portion, removing the photoresist in the exposure portion and the like are performed. Thereafter, a protective film is formed on an uppermost layer to finish the forming steps of the element portions.

In the next step, machining such as lapping in which a throat height, an MR height or the like of each element portion is machined to a suitable value is performed for the ceramic bar where a plurality of element portions are formed. In general, in the magnetic disc apparatus, in order to stabilize the output characteristics from the magnetic head, it is necessary to keep the distance between the magnetic polarity portion of the magnetic head and the surface of the recording media at a very short constant distance. The throat height or the MR height is important parameters for restricting this distance.

After the predetermined throat height or the like is obtained in each element portion, machining for forming a surface slanted to the lapped surface lapping an end portion, machining for making curved surface or grooving the lapped surface is further performed. After that step, the ceramic bar is cut into individuals one by one for each element portion. Each element portion constitutes a part of the magnetic head for the magnetic disc apparatus. The ceramic portion of this part is used as a slider lifted by the air blow pressure caused by the rotation of the disc above the magnetic disc when the magnetic head is used in the magnetic disc apparatus. The element portion is used as a head core for performing the recording and/or reproducing of the magnetic signal of the disc.

Note that the throat height means a length (height) of the portion that is a magnetic end portion for performing the recording/reproducting of the magnetic signal in such a head core and where the two magnetic polarities face each other with a fine gap. Also, the MR height means a length (height) from the end portion on the side facing the medium of the MR element to the end portion on the opposite side. In order to make it possible to record/reproduce the signal suitably, it is necessary to select the values of the throat height and the MR height to predetermined values. A high precision is needed for the lapping machining for obtaining these predetermined values.

Also, as described above, the slider is kept in the condition that the slider is lifted at a fine interval away from the disc surface by the air blow pressure of the air flow generated in concomitant with the high speed rotation of the disc. In order to perform the readout of the information from the disc or the write of the information to the disc by the element portion with high precision, it is necessary to always stabilize the lifting height of the lifted slider and the posture of the slider upon lifting. The above-described machining or the like for making the curved surface is effected to the slider so that the slider may be lifted in a stabilized manner.

However, since in general, the above-described ceramic bar has a strain, a curve or the like due to the stress generated by the formation of the element portion or the cut away process performed on the ceramic substrate, it is difficult to obtain the above-described high machining precision simply by fixing the ceramic bar and performing the lapping machining. For this reason, the apparatus for performing the lapping of the magnetic head in the form of the ceramic bar with high precision, that is not a general lapping apparatus, is disclosed in, for example, U.S. Pat. No. 5,620,356. Also, the present applicant of this application proposes several such apparatus and methods (Japanese Patent Application No. 11-162799 or the like).

The method for machining the ceramic bar and obtaining the predetermined throat height or the like will now be described. First of all, the surface, opposite the lapping surface, of the ceramic bar is bonded to a jig with adhesives or the like and the surface to be lapped of the ceramic bar is pushed against the lapping surface of the lapping plate through the jig to perform the lapping the surface to be polished. This jig is subjected to the load from the outside and so forth so that the portion for supporting the ceramic bar is deformed and simultaneously the ceramic bar is also deformed. As result, it is possible to correct the curvature or the like of the ceramic bar itself.

In accordance with this method or using the apparatus in this method, it is possible to perform the above-described machining for making the curved surface (hereinafter, referred as R machining). However, as a matter of fact, since it is difficult to obtain the smooth curved surface (hereinafter, referred as R shape) in view of the structure of the apparatus, in general, the R machining is performed by using an apparatus that is different from these apparatus. Out of the R shapes, a shape in which a central portion of the lapping surface projects to form a part of a spherical surface is particularly called a crown shape. The machining for obtaining the crown shape is called crown machining. The present applicant proposes the apparatus and method disclosed in, for example, Japanese Patent Application Laid-open No. 11-302305 as the lapping apparatus and method for performing the crown machining to each slider.

The lapping method for performing the crown machining to the ceramic bar disclosed by the present applicant will now be described. In order to impart a predetermined crown shape to the ceramic bar, the lapping surface of the lapping plate made of, for example, tin used for lapping the ceramic bar is formed into a conical shape made of a substantially concave surface forming a part of the spherical surface having a predetermined radius. During polishing, the ceramic bar is held by a laterally elongated jig extending in the longitudinal direction of the ceramic bar. More specifically, the surface, opposite the lapping surface of the ceramic bar, is sucked to the elastic material such as a rubber plate or the like attached to one end surface of the laterally elongated jig with adhesives so that the ceramic bar is held at one face of the jig.

The central portion of the jig is subjected to the load so that the ceramic bar is pushed against the lapping surface, and the crown shape is formed to the surface to be lapped of the ceramic bar. At the same time, the suitable load is applied to both end portions thereof. As a result, the non-uniformity in the longitudinal direction of the crown shape formed in the ceramic bar may be reduced. Furthermore, the MR value of the MR element formed in the ceramic bar is measured during polishing. The load for pushing the ceramic bar to the lapping surface is controlled on the basis of the measurement result to thereby control the lapping amount upon crown machining.

DISCLOSURE OF THE INVENTION

In accordance with the higher density recording of the magnetic recording medium, the error range allowed in the lapping step for obtaining the predetermined value such as a throat height becomes smaller than ever. In many cases the lapping amount in the crown machining is smaller than the lapping amount in the step for obtaining the predetermined throat height. After performing the crown machining, the value of the throat height is not substantially changed. However, the error allowed in the step for machining the throat height or the like gets smaller and smaller every year. As in the current case, in the case where the lapping precision with, for example, ±0.01 micrometers or less is needed within the ceramic bar, the higher precision is needed also for the crown machining.

Also, as a matter of fact, elements formed on the ceramic bar-shaped simultaneously has the error in formation position caused in the element forming step. For example, in the case where the photoresist is exposed, there are some cases where the exposure process is not performed at once to all the portion on the wafer, but the surface of the wafer is divided into a plurality of sections and the exposure process is performed for each section. In general, it is known that there is an error of 0.01 to 0.05 micrometers in positioning upon the exposure by the exposing device.

With respect to the elements on a single ceramic bar, the exposure process divided for a plurality of sections is performed as viewed in the longitudinal direction. In some cases, the positional displacement of the elements caused by the exposure process, the magnitude thereof remarkably exceeds the above-described required precision depending upon the displacement direction. In addition to the correction of the curve of the above-described ceramic bar, it is necessary to correct the error in position.

Furthermore, in the above-described element formation step, the process such as film formation, exposure, etching or the like is performed. In each step, the error in the longitudinal direction and in the transverse direction of the wiring and in the thickness direction of the thin film would occur. These errors are superimposed with each other and are detected as a difference in the required lapping amount for each element upon the adjustment of the throat height or the like as the positional error between the respective elements in the lapping direction.

In view of the above-noted problem, the present applicant discloses in the Japanese Patent Application No. 12-44269, the apparatus and method that may impart the deformation such as a complicated curvature to the ceramic bar in response to the positional displacement of each element caused by the exposure process and may thus adjust the lapping amount of the ceramic bar and make the non-lapped portion of each element uniform. However, there is a possibility that a portion having a large lapping amount locally exists in the ceramic bar having the predetermined value of the throat height provided by using the apparatus and method. For this reason, in the case where the crown machining is effected to these ceramic bars, also in the crown machining, it is necessary to impart the deformation that is the same as that imparted to the ceramic bar upon the throat height adjustment or the deformation similar to that.

In view of the above-described requirements, an object of the present invention is to provide a lapping apparatus and a lapping method that may effect the crown machining in accordance with each element on the ceramic bar onto the ceramic bar that is largely locally lapped to thereby suppress the non-uniformity in machining amount between the respective elements after the crown machining within the ceramic bar. Also, an object of the present invention is to provide a lapping apparatus and a lapping method that may reduce the cost needed for machining without using any jig for holding the ceramic bar, that has been needed for the crown machining or the machining of adjustment of the above-described throat height or the like.

In order to solve the above-noted problems, according to the present invention, there is provided a lapping apparatus for lapping an object to be lapped and elongated in one direction, in which a plurality of elements including at least one of an electric-magnetic converting element and a magnetic-electric converting element are formed in the longitudinal direction, comprising a lapping table rotatably driven and having a lapping surface, a lapping head mounting frame disposed movably relative to the lapping surface, and a lapping head supported by the lapping head mounting frame, characterized in that the lapping head comprises a holder portion extending in the longitudinal direction and made of elastic material for holding the object to be lapped at a predetermined position on a surface, an elevating portion for supporting the holder portion and integrally moving up and down with the holder portion relative to the lapping surface, and a plurality of holder portion deforming means for imparting load to the holder portion for deforming the object to be lapped together with the holder portion.

Furthermore, in order to attain the above-mentioned objects, in the lapping apparatus according to the present invention, the lapping surface may constitute a part of spherical surface having a predetermined radius of curvature. The holder portion deforming means may have a second elastic member having a flexible comb-shaped portion, and a plurality of actuators flexed comb teeth of the comb-shaped portion independently of each other, in which a specific portion of the comb teeth is arranged on a back surface of the holder portion, and the comb-shaped portion is flexed to impart the load to the holder portion.

Also, the second elastic member may be made of a metal plate and the specific portion may be a tip end of the comb tooth. The plurality of actuators may be arranged into a plurality of rows extending in the longitudinal direction, and the actuators may not be aligned with each other in a direction perpendicular to the longitudinal direction in the adjacent rows. Furthermore, the second elastic members may be used as a pair, the comb tooth portions may face each other, and the tip end of one of the comb tooth ends may be disposed between the tip ends of the other comb tooth end.

Furthermore, in order to attain the above mentioned objects, in the lapping apparatus according to the present invention, the holder portion deforming means may be disposed on the back surface of the holder portion and may have a plurality of actuators for imparting the load to the holder portion. The holder portion deforming means have a transmission member in response to each of the plurality of actuators and the actuators may impart the load to the holder portion through the transmission member. The plurality of actuators may be arranged in a plurality of rows extending in the longitudinal direction, and the actuators may not be aligned with each other in a direction perpendicular to the longitudinal direction in the adjacent rows.

Furthermore, the elastic material constituting the holder portion may be mainly made of rubber. The actuators may be driven by using pressurized medium. The holder portion deforming means may be arranged to impart the load to a position in accordance with each of the plurality of elements formed on the object to be lapped.

Also, in order to attain the above-mentioned objects, according to the present invention, there is provided a lapping method for lapping an object to be lapped and elongated in one direction, in which a plurality of elements including at least one of an electric-magnetic converting element and a magnetic-electric converting element are formed in the longitudinal direction, comprising the following steps of: holding the object to be lapped on a surface of an elastic member, depressing the object to be lapped substantially uniformly in the longitudinal direction through the elastic member to a lapping surface constituting a part of a spherical surface having a predetermined radius of curvature formed on a lapping table drivingly rotated and lapping the object to be polished, characterized in that when the object to be lapped is depressed substantially uniformly to the lapping surface, in addition to the substantially uniform depression, the load is applied at a plurality of points to the object to be lapped from the back surface of the elastic member.

In the lapping method according to the present invention, the load imposed at the plurality of points may be controlled in response to a measurement result obtained by measuring characteristics of the elements formed on the object to be lapped. Also, the plurality of points at which the load is imposed may correspond to the respective elements described before formed on the object to be lapped.

BEST MODE FOR CARRYING OUT THE INVENTION (First Embodiment)

Figure 1:
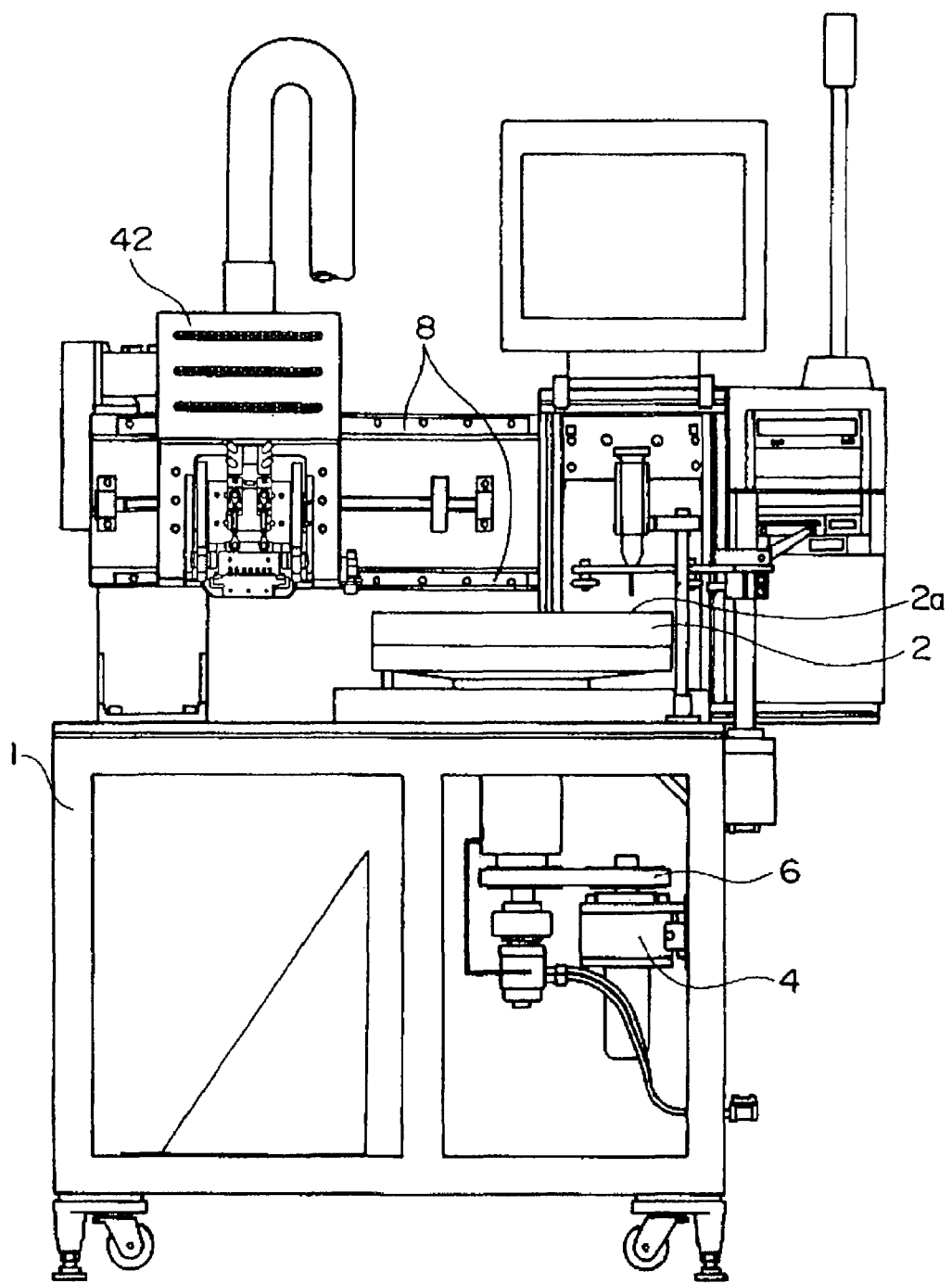
FIG. 1 is an overall frontal view showing a lapping apparatus for a magnetic head in accordance with a first embodiment of the present invention.
Figure 2:
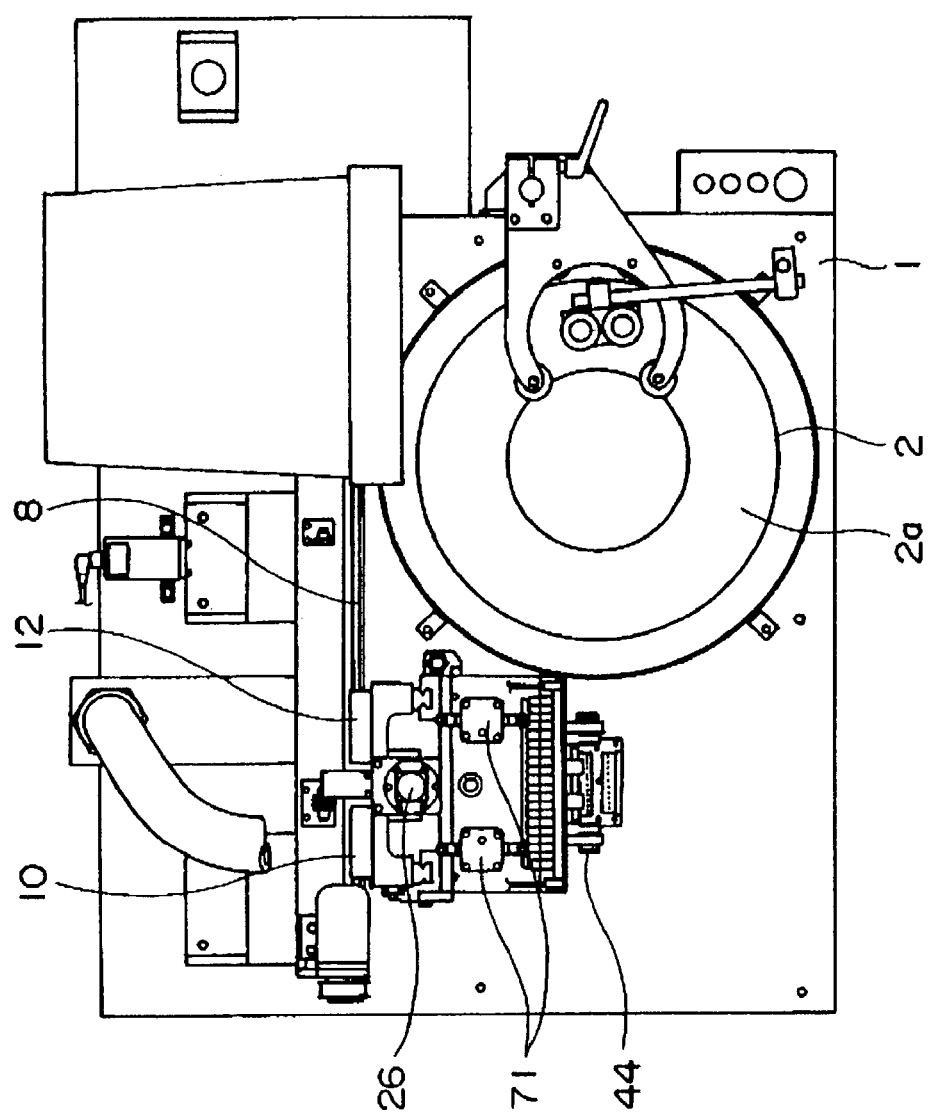
FIG. 2 is a plan view of the apparatus shown in FIG. 1.

A lapping apparatus for a magnetic head in accordance with a first embodiment of the present invention will now be described with reference to the accompanying drawings. FIG. 1 is an overall frontal view showing a lapping apparatus for a magnetic head in accordance with the first embodiment of the present invention. FIG. 2 is a plan view. The overall structure of the lapping apparatus for the magnetic head will now be described with reference to FIGS. 1 and 2. The magnetic head lapping apparatus is provided with a base 1. A lapping plate 2 is supported rotatably within the horizontal plane to the lapping base 1. Furthermore, the lapping plate 2 is rotated through a belt 6 by a plate driving motor 4 that is a rotational drive source provided in the base 1. In order to impart a predetermined R-shape (crown shape) onto a surface of the object to be lapped in the lapping step, the lapping surface 2a in the lapping plate 2 is subjected to a conical shape in the substantially concave surface that forms a part of a spherical surface having a predetermined radius.

Also, a pair of guide rails 8 separated from each other in the vertical direction are supported above the base 1 so as to extend in the horizontal direction. Furthermore, a laterally moving slider 10 guided slidably in the horizontal direction by the pair of guide rails 8 is provided. A lapping head mounting frame 12 is mounted movably up and down on the laterally moving slider 10 (so as to be driven up and down for adjusting the height). The drive of the laterally moving slider 10 may be executed, for example, by screwing together a ball screw nut on the side of the slider 10 with a ball screw shaft in parallel with the guide rails 8 and rotating the ball screw shaft by a motor. Furthermore, the slider 10 and the lapping head mounting frame 12 may take a reciprocating linear motion.

Figure 3:
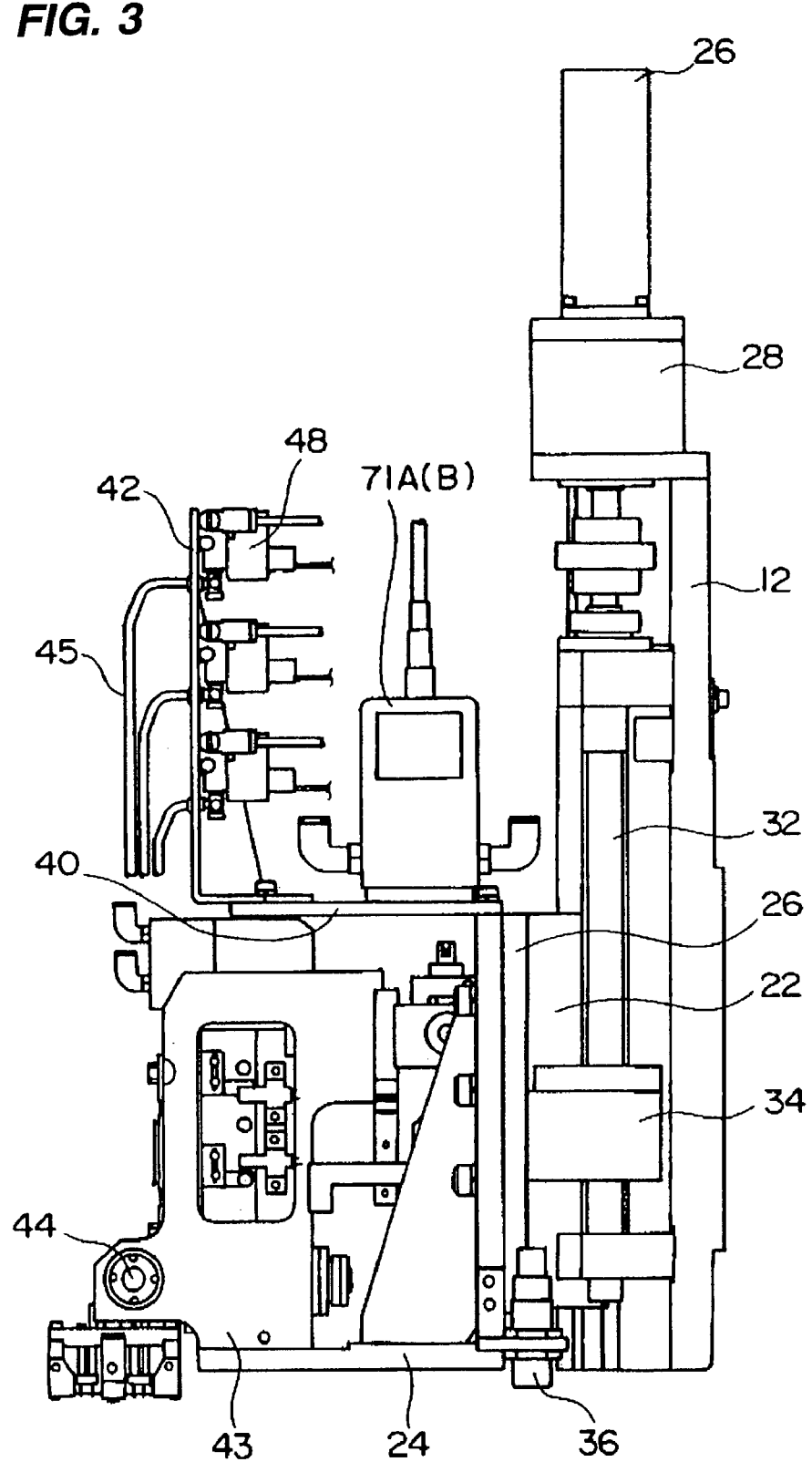
FIG. 3 is a side elevational view of a lapping head or the like in the apparatus shown in FIG. 1.
Figure 4:
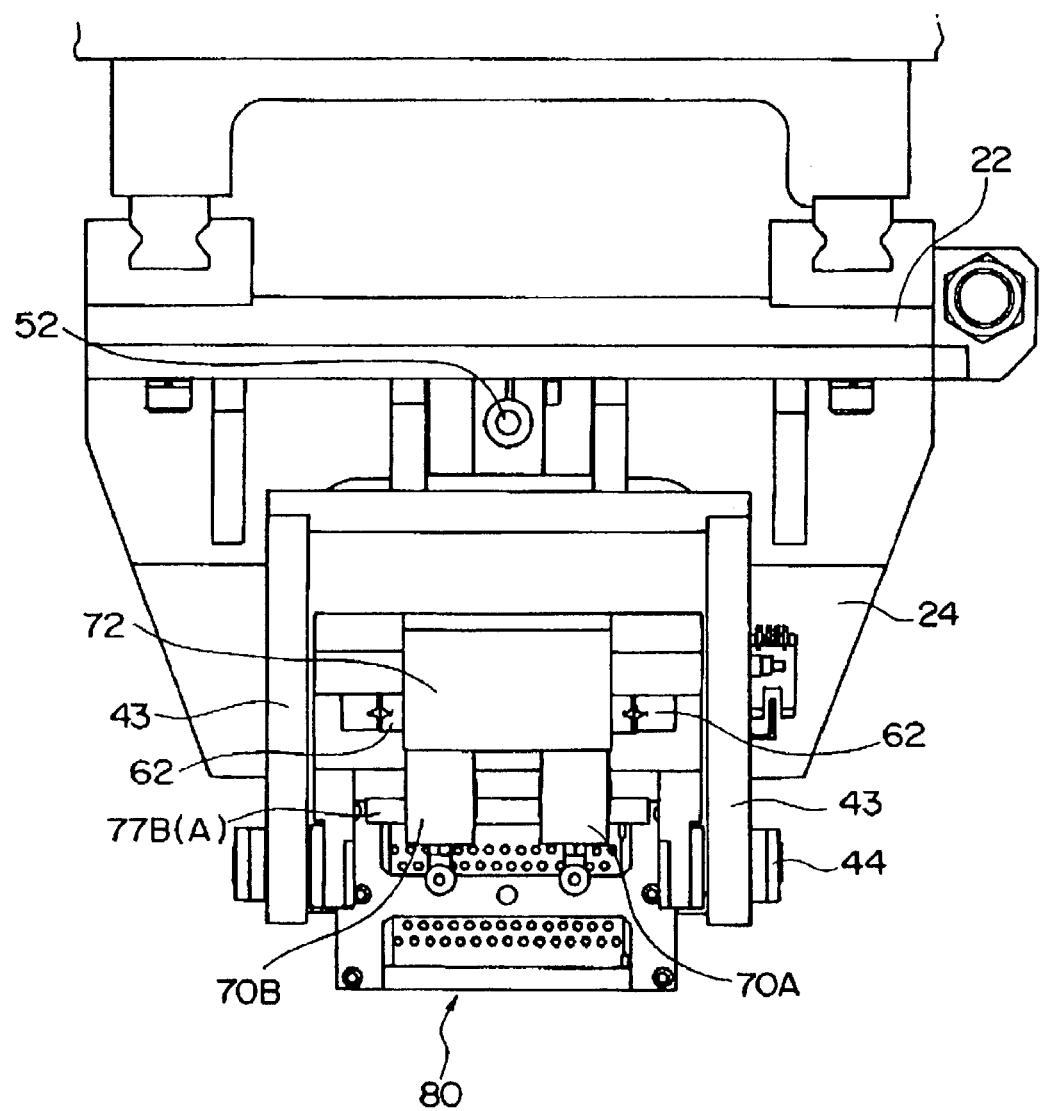
FIG. 4 is a plan view showing the lapping head or the like shown in FIG. 3.
Figure 5:
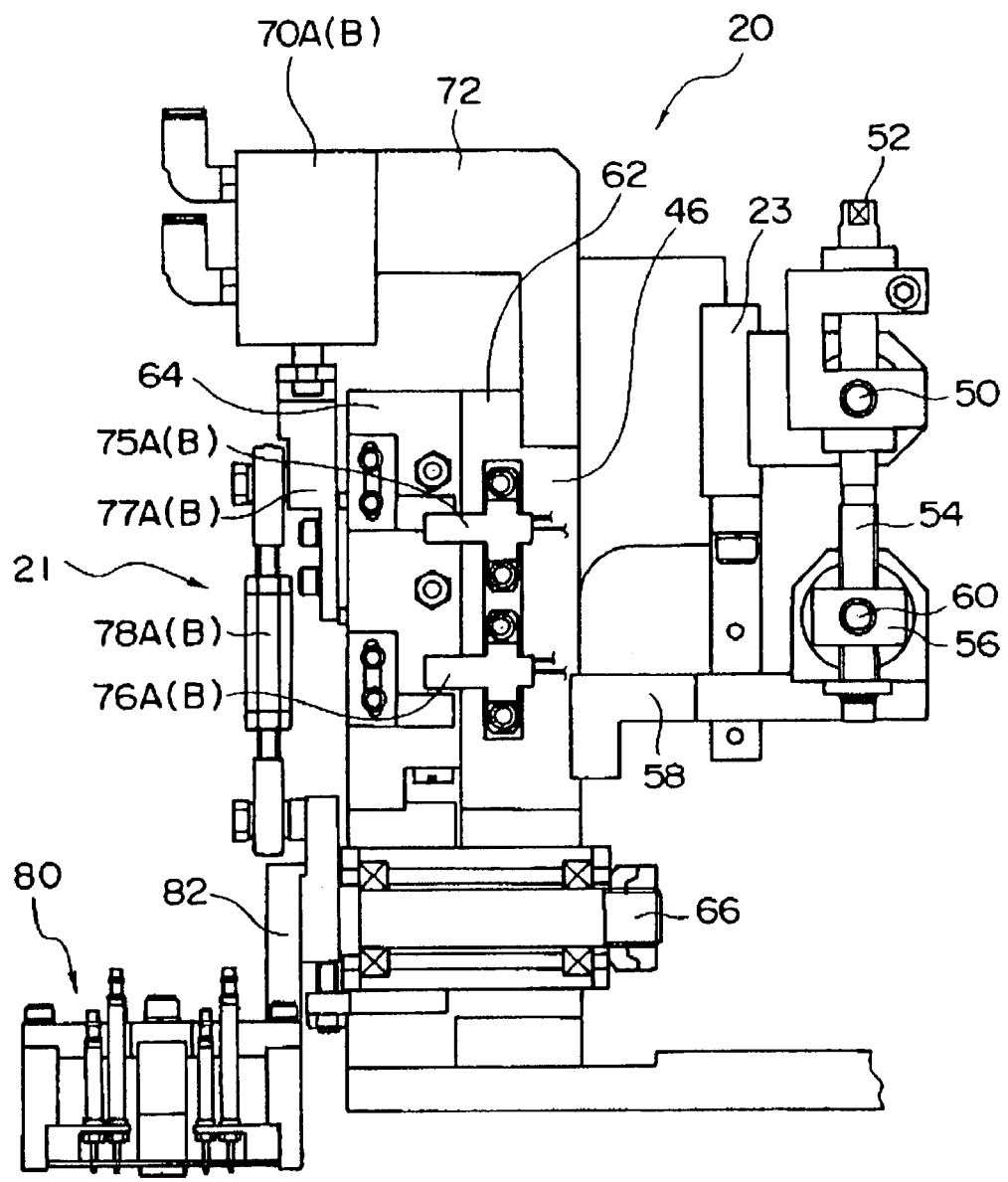
FIG. 5 is a side elevational view showing the lapping head or the like shown in FIG. 3.
Figure 6:
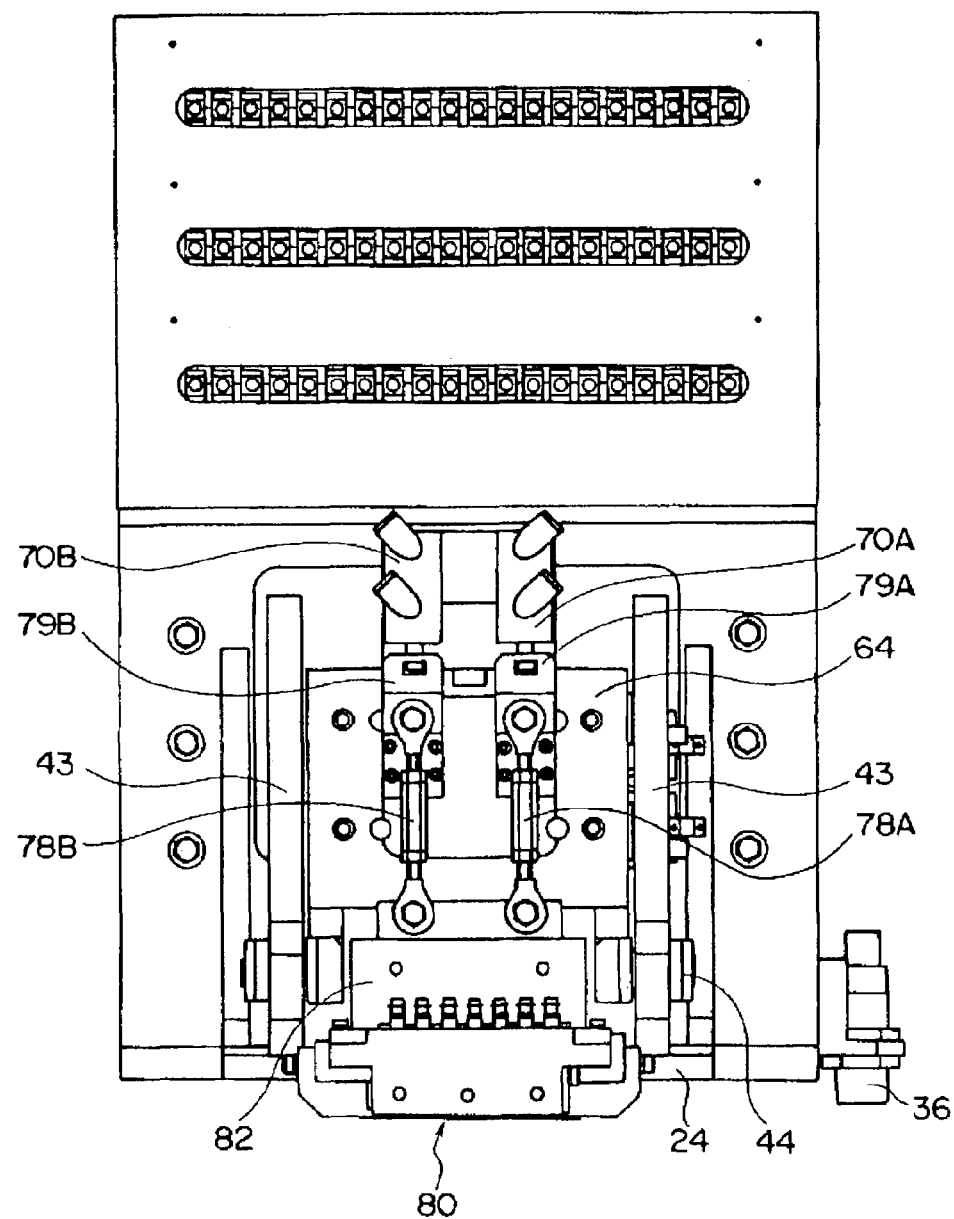
FIG. 6 is a frontal view showing the lapping head or the like shown in FIG. 3.

FIG. 3 is a side elevational view showing a lapping head 20 including the lapping head mounting frame 12 and the like and related to the lapping apparatus in accordance with the first embodiment of the present invention. FIG. 4 is a plan view showing the lapping head and the like. FIG. 5 is a side elevational view of the lapping head 20 and the like. FIG. 6 is a frontal view of a valve bracket used when pressurized air is fed to the magnetic head and the lapping head 20. Note that for the sake of understanding the drawings more easily, a part of an air pipe 45 and the like extending from the valve bracket 40 is omitted.

As shown in FIGS. 2 and 3, a lapping head mounting bracket 24 is mounted through a Z axis slider 22 on the lapping head mounting frame 12. The bracket 24 is driven in the Z axis (substantially perpendicular to the lapping surface) through a ball screw 30 and a ball screw nut 34 by a Z axis motor 26 and a speed reducer 28 fixed to the lapping head mounting frame 12. An elevating portion is constituted by the bracket 24. The bracket 24 is lowered relative to the lapping surface and the lower end of the movement is detected by means of a photo sensor 36 that is proximity switch. An electric pneumatic regulator fixture portion 40 to which are fixed an electric pneumatic regulator 71 for balance and a valve bracket 42 and a lapping head 20 to be actually driven by the electric pneumatic regulator are mounted on the bracket 24.

As shown in FIGS. 3 to 6, a tilting shaft 44 is fixed to side plates 43 fixed to the lapping head mounting bracket 24 in the lapping head 20 and a head portion 21 is tiltably mounted about the tilting shaft 44. Furthermore, in the lapping head 20, a tilting drive means composed of a pivot shaft 50, a rotary shaft 52, a ball screw shaft 54 coupled with the rotary shaft 52, a ball screw nut 56 engaging with the ball screw shaft 54 and an arm 58 fixed at one end to the ball screw nut 56 around the pivot shaft 60 and fixed at the other end to a tilting portion 46 is fixed to a drive portion mounting bracket 24 through a coupling plate 23 and the side plates 43.

With such a structure, the tilting portion 46 may tilt to the Z axis by the tilting driving means. Note that in the embodiment, the end portion of the rotary shaft 52 is manually rotated to adjust the slant angle of the lapping head to Z axis but it is possible to provide a driving means such as an independent motor.

An elevating portion 64 is mounted movably up and down to the tilting portion 46 on the tilting portion 46 through a slide bearing 62. The pivot shaft 66 perpendicular to the Z shaft and the tilting shaft 44 is fixed to the lower end of the elevating portion 64, and a mechanism 80 for pushing the object to be lapped is held through a pushing mechanism holder plate 82 and the pivot shaft 66. Balance cylinders 70A and 70B controlled and driven by electric pneumatic regulators 71A and 71B are mounted through a bracket 72 on the upper portion of the tilting portion 46.

The shaft ends of the balance cylinders 70A and 70B are coupled with the pushing mechanism holder plate 82 in positions on the right and left sides of the pivot shaft 66 through coupling members 79A and 79B and connecting rods 78A and 78B. Accordingly, the drive of the mechanism 80 for pushing the object to be lapped substantially in parallel with the Z axis direction by the balance cylinders 70A and 70B is possible. It is possible to adjust the pushing balance to the right and left sides of the mechanism 80 for pushing the object to be lapped to the pivot shaft 66.

Note that, the drive amount to the pushing mechanism 80 by the balance cylinders 70A and 70B and the pushing balance are detected by reference position sensors 77A and 77B, lower portion sensors 76A and 76B and upper portion sensors 75A and 75B fixed to the tilting portion 46. Also, in the present embodiment, the lapping surface 2a is in the form of the conical shape that is substantially concave. The restriction of the right and left of the pivot shaft 66 by the balance cylinders 70A and 70B is eliminated and the lapping head 20 is lowered to the lapping surface 2a so that the lapping head 20 may always keep the vertical posture about the center of curvature of a curved surface of the lapping surface 2a.

Figure 8:
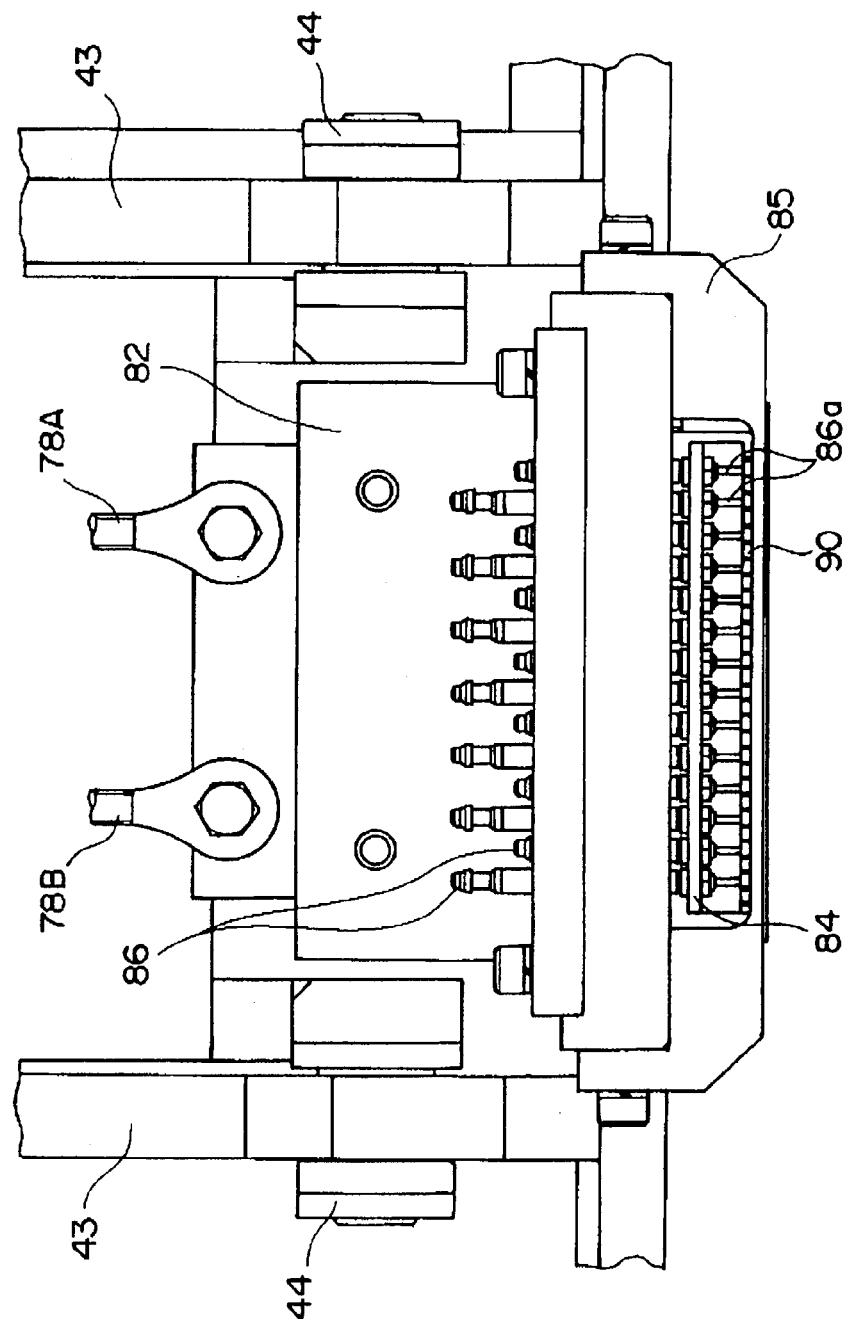
FIG. 8 is a schematic frontal view of the pushing mechanism shown in FIG. 7.
Figure 9:
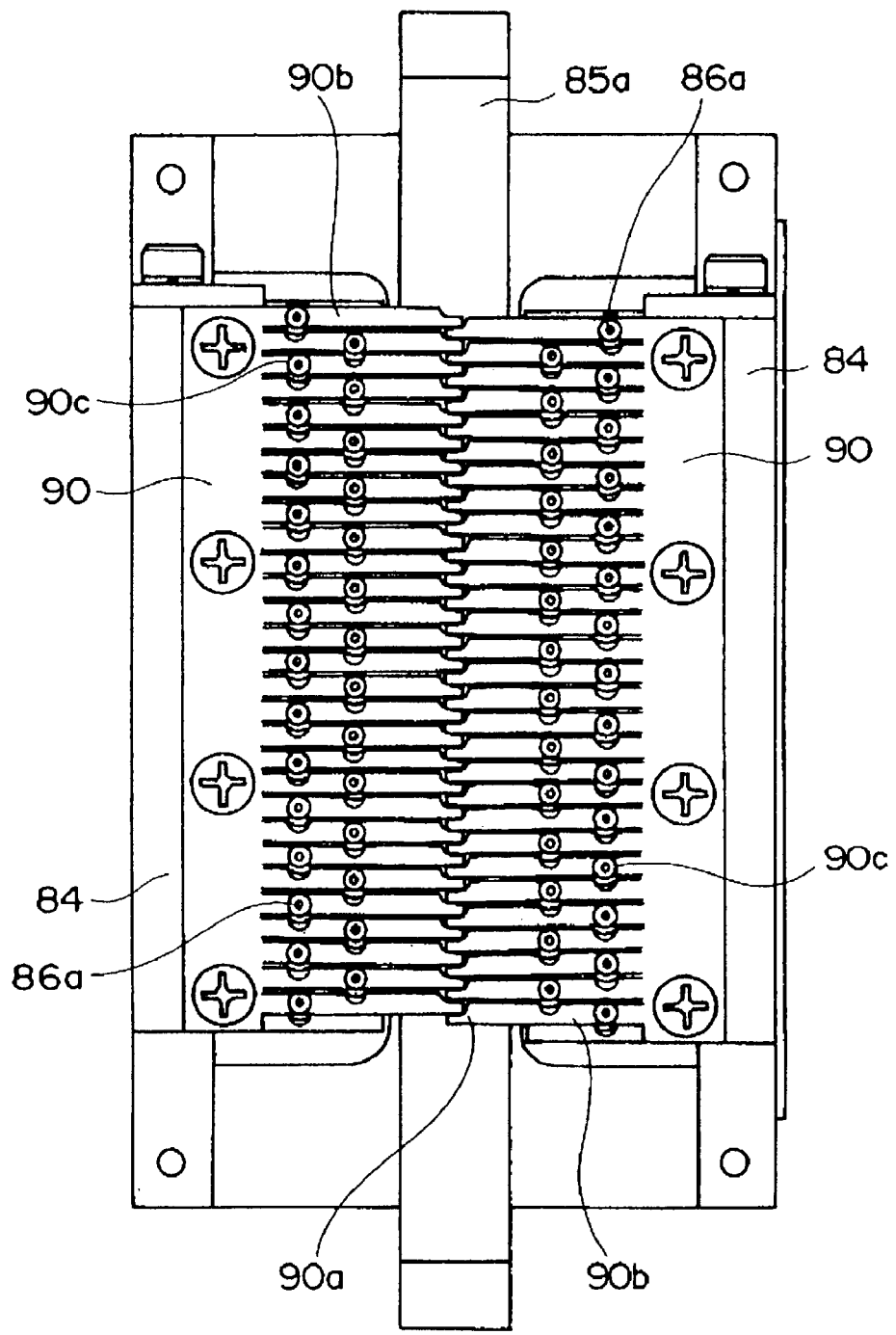
FIG. 9 is a lower partial perspective view with a comb-shaped jig in the pushing mechanism shown in FIG. 7.

The mechanism 80 for pushing the object to be lapped will now be described in detail with reference to FIG. 7 which is a cross-sectional view as viewed in the lateral direction, FIG. 8 which is a schematic frontal view and FIG. 9 shows a condition as viewed from the lower side while fixing a comb tooth jig in place. Note that the direction (vertical to the paper surface) in FIG. 7 where the pushing mechanism holder plate 82 extends corresponds to the Z axis and for the sake of explanation, the direction perpendicular to the Z axis and parallel with the paper surface of FIG. 7 is assumed as an X axis and the direction perpendicular the paper surface is assumed as a Y axis.

Figure 7:
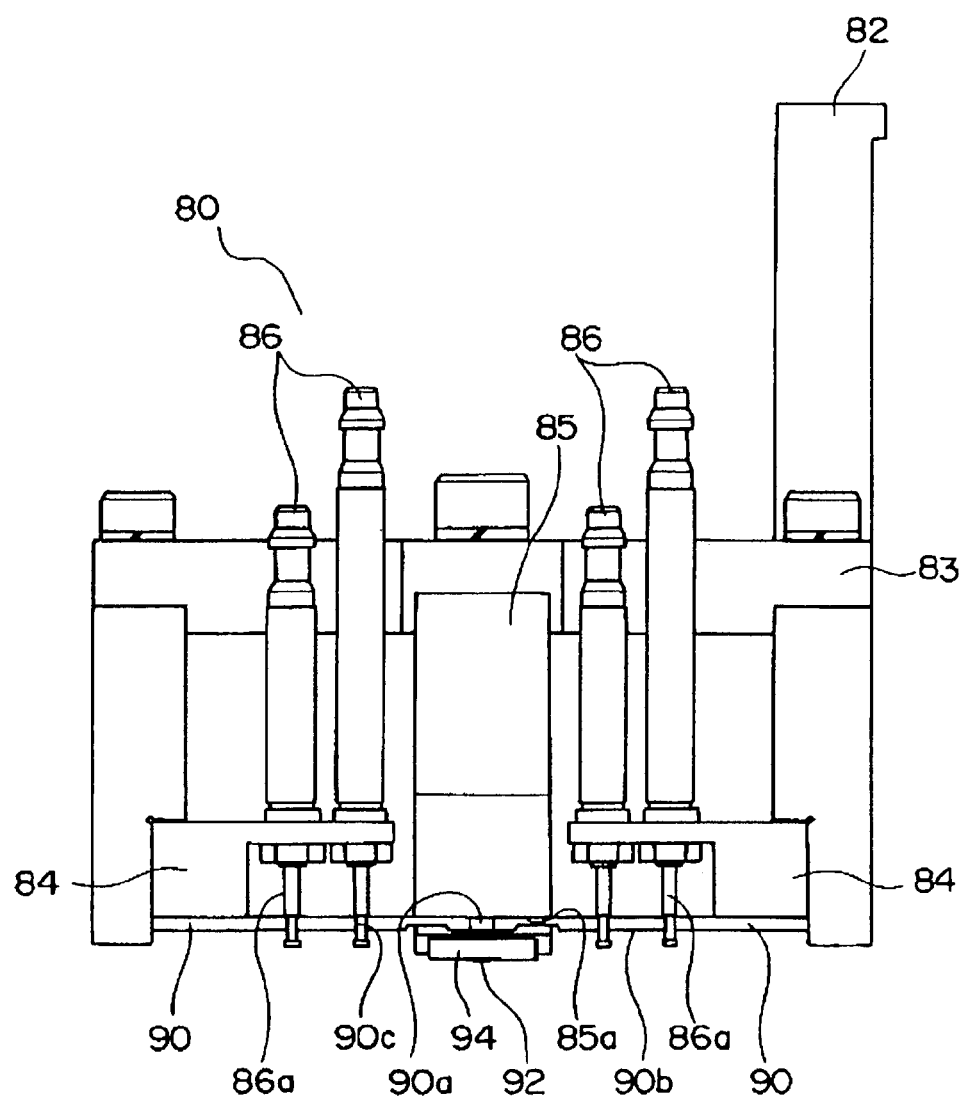
FIG. 7 is a side perspective view of a pushing mechanism for an object to be lapped in the lapping head or the like shown in FIG. 3.

In FIG. 7, a cylinder fixing bracket 84 and a holder fixing bracket 83 kept in the position in parallel in the X axis direction are fixed perpendicular to the pushing mechanism holder plate 82 and a lapped object holder block 85 is fixed to the central portion of the holder fixing bracket 83 so as to extend in the Y axis direction. Furthermore, a plurality of cylinders 86 that are actuators are fixed to the holder fixing bracket 83 together with the cylinder fixing bracket 84. The plurality of cylinders 86 are connected through an air introduction tube 45 (not shown) to electric pneumatic regulator 48 fixed to the valve bracket 42 so as to be controlled and driven by the electric pneumatic regulators 48.

A flexible comb-shaped jig 90 that is a second elastic member is fixed to the lower end of the cylinder fixing bracket 84. In this case, a comb tooth tip end portion 90a is clamped between the lower end face 85a of the holder block and the back surface of a lapped object holder rubber 94 extending in the Y axis direction and fixed at both ends by the holder block. Furthermore, rod receiving holes 90c for receiving cylinder rods 86a are formed in the comb tooth portion 90b of the comb-shaped jig 90. The comb tooth tip end portion 90a are flexed in the Z axis direction in response to the drive of the tip end portions of the cylinder rods 86a in the Z axis direction by the cylinders 86. As described above, the comb-shaped jig 90 and the cylinders 86 that are actuators work as a holder portion deforming means in cooperation with each other. A lapped object holder rubber 94 holds the ceramic bar 92 that is the object to be polished, on its surface by a kind of vacuum suction effect or a self viscous effect and works as a holder portion made of elastic material.

As described above, the ceramic bar 92 is held on the surface of the rubber 94 and pushed against the lapping surface 2a to perform the crown machining. During machining, a specific portion of the ceramic bar is deformed by the deformation given to the rubber 94 by driving the comb tooth tip end portions 90a, or the specific portion of the ceramic bar 92 is pushed strongly against the lapping surface 2a, so that the lapping amount of the specific portion of the ceramic bar 92 may be increased. Note that, the comb tooth tip end portion 90a imparts the deformation to the ceramic bar 92 through the rubber 94 that is made of elastic material but some percentage of the deformation amount of the comb tooth tip end portion 90a is attenuated by the elastic deformation of the rubber 94. Accordingly, the drive amount of the tip end portion of the cylinder rod 86a should be determined in view of the attenuation amount by the rubber 94.

Note that, an object of this embodiment is to perform the above-described deformation by the comb tooth tip end portion 90a for each element formed on the ceramic bar. For this reason, in this embodiment, as shown in FIG. 9, the width of the comb tooth tip end portion 90a is half an width of the comb tooth portion 90b, the comb-shaped jigs 90 having these comb tooth tip end portions 90a are arranged on both sides of the holder block lower end surface 85a corresponding to the holder position of the ceramic bar 92, and the comb tooth tip end portions 90a of the comb-shaped jig 90 on both sides are used in combination in a staggered manner with each other. With such a structure, the comb tooth tip ends 90*a* is caused to correspond to the region assigned to each element on the ceramic bar.

Furthermore, a size of the cylinder 86 that may provide the necessary drive amount of the cylinder rod, particularly, a diameter of the cylinder 86 is relatively large in the present situation in comparison with a width of the comb tooth portion 90*b* and a size of the region on the ceramic bar assigned to each element. For this reason, as shown in FIG. 9, the cylinders 86 are arranged in two rows for each on both sides of the holder block 85 and the two rows are arranged in the staggered manner with each other so that the different cylinders are caused to correspond to the associated comb tooth portions 90*b*.

With the above-described structure of the lapping apparatus for the crown machining, it is possible to perform the crown machining corresponding to each element on the ceramic bar for the ceramic bar that has been locally polished, and to reduce the non-uniformity in machining amount between the respective elements after the crown machining within the ceramic bar. Also, it is possible to perform the lapping machining such as crown machining without using any jig for holding the ceramic bar that is need in the crown machining in the prior art.

Note that, in this embodiment, the comb tooth portion 90*b* is connected to the cylinder rod 86*a*, and the rubber 94 is deformed in the comb tooth tip end portion 90*a*. However, the length of the comb tooth may be extended and coupled with the cylinder rod 86*a* at the tip end portion of the comb tooth so that the rubber 94 may be deformed at the comb tooth portion. Furthermore, in this case, the proximal end portion of the comb tooth portion may be coupled with another cylinder rod. Also, the coupling between the comb tooth portion 90*b* and the cylinder rod 86*a* is carried out by means of the rod receiving hole 90*c*. However, the coupling method is not limited thereto and it is possible to use another coupling member or a screw fastening means by forming a screw groove in the rod receiving hole.

In this embodiment, the two comb-shaped members are used and two right and left rows of cylinders are arranged in view of the size of the cylinders that may impart a sufficient deformation amount to the region on the ceramic bar assigned to each element. However, the present invention is not limited thereto. In the case where a cylinder having a much smaller diameter may be used, a single row may be used for each of the right and left sides and furthermore, it is possible to use a member where the two comb-shaped members are integrated with each other so that the comb tooth portion has a smaller width. In this case, the cylinders are coupled with both ends of the comb tooth to thereby make it possible to reduce the load to each cylinder and to reduce a diameter of the cylinders.

Further, in this embodiment, the flexible comb-shaped jig 90 made of stainless steel is used. However, if the material has sufficient flexibility and rigidity, the material is not limited to the stainless steel. With respect to the rubber 94 for holding the ceramic bar actually, the material is not limited to rubber but if the material may hold the ceramic bar by the self viscous effect or the like and may be elastically deformed, the material may be used. Furthermore, the member is not always composed of a single component and may be formed of a plurality of divided components.

Furthermore, in this embodiment, the cylinders pneumatically driven are used because of the easiness in handling as actuators but the drive medium is not limited to the air and the controlling system is not limited to the electric pneumatic regulators. It is possible to use liquefied material for the drive medium and to use simple air regulators for the controlling system. Furthermore, it is possible to use a micro actuator made of piezoelectric element or the like for the cylinder.

(Second Embodiment)

A lapping apparatus for a magnetic head in accordance with a second embodiment of the present invention will now be described with reference to the accompanying drawings. Since there is a difference only in the structure of the lapping head between the lapping apparatus according to this embodiment and the lapping apparatus in accordance with the first embodiment, the explanation as to the same structure as that of the lapping apparatus of the first embodiment will be omitted and the lapping head having the different point will now be solely described. Note that the same reference numerals are used to explain the structural components having the same functions as those of the first embodiment.

Figure 10:
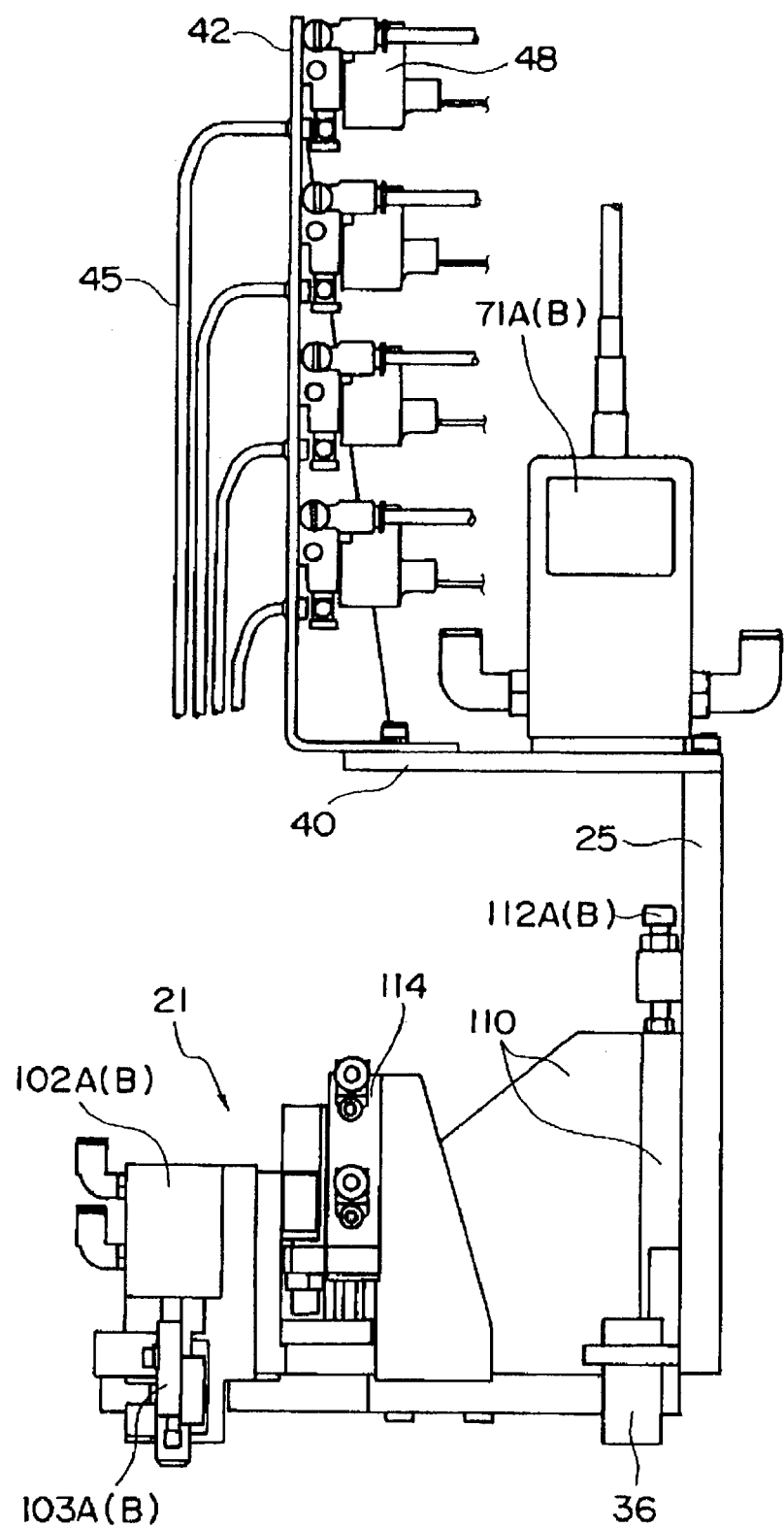
FIG. 10 is an overall frontal view showing a lapping apparatus for a magnetic head in accordance with a second embodiment of the present invention.
Figure 11:
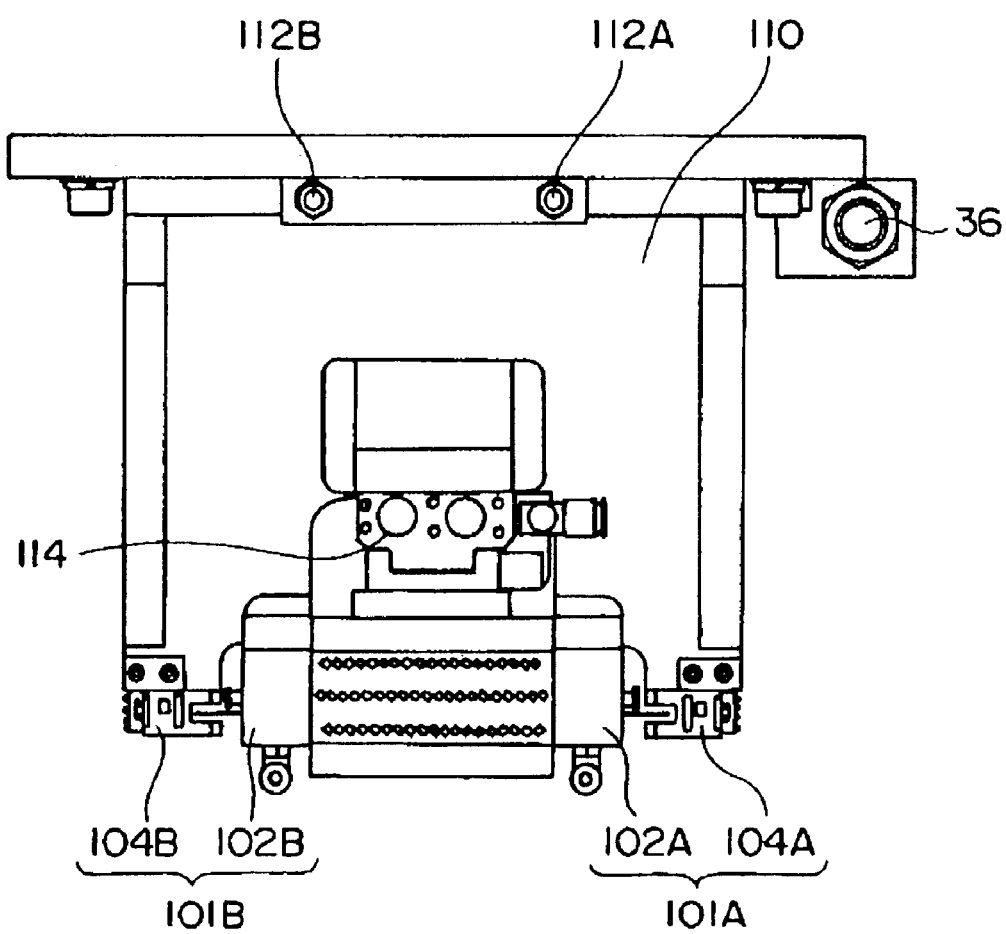
FIG. 11 is a plan view of a lapping head or the like in the apparatus shown in FIG. 10.
Figure 12:
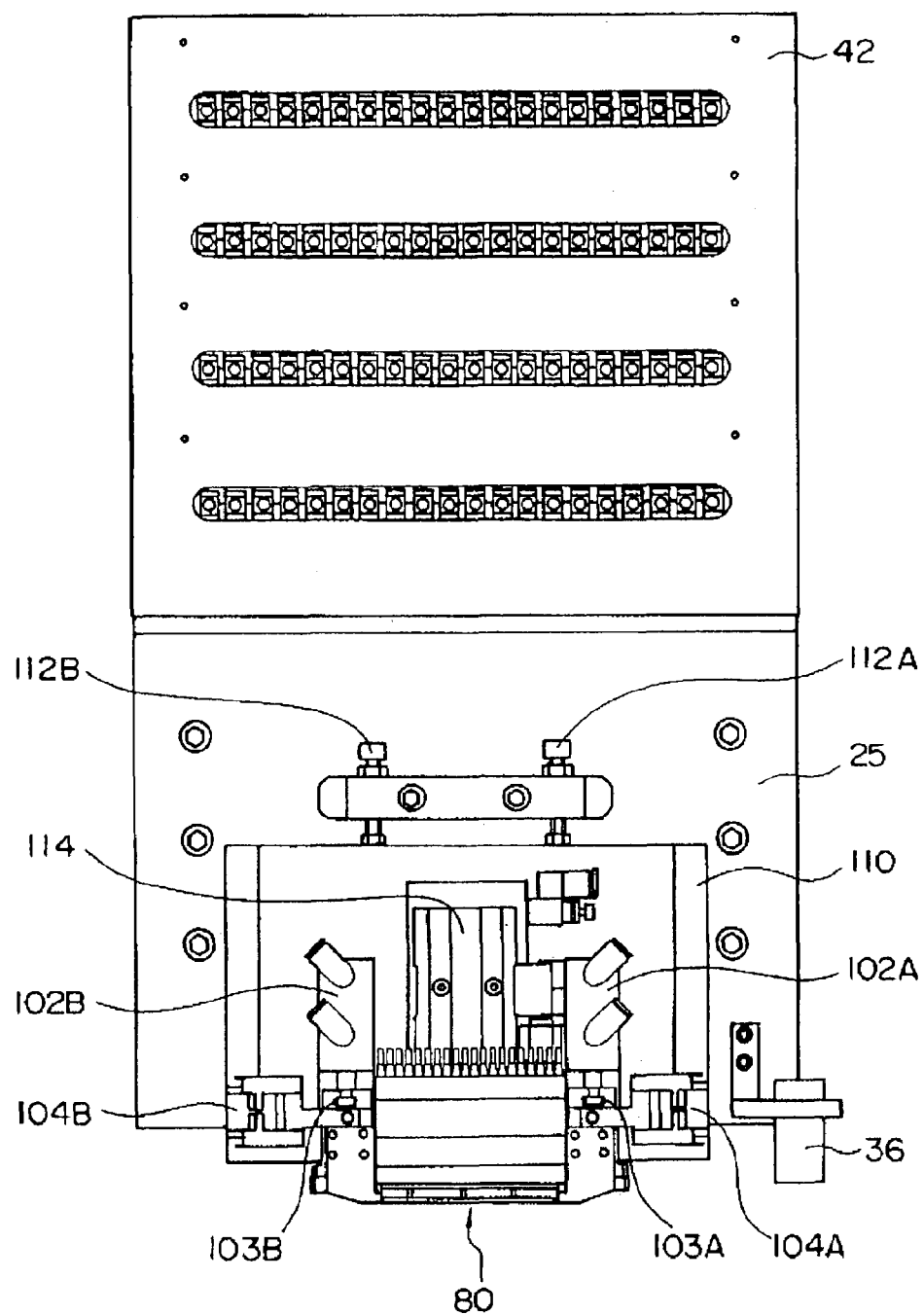
FIG. 12 is a side elevational view a lapping head or the like in the apparatus shown in FIG. 10.

FIG. 10 is a side elevational view showing a lapping head 20 or the like related to the portion different from that of the first embodiment and related to the lapping apparatus in accordance with the second embodiment of the present invention, FIG. 11 is a plan view of the lapping head or the like except for the electric pneumatic regulator fixing portion 40 and FIG. 12 is a frontal view of the lapping head or the like, respectively. Note that, in the same manner as in the first embodiment, the air pipes 45 extending from the valve bracket 42 or the like are omitted from the drawings.

As shown in FIGS. 10 to 12, the lapping head 20 in accordance with the second embodiment does not have the tilting shaft, the tilting portion driving means or the like in the first embodiment and is supported by the head holder 110 that is rotatable about the pivot shaft 66 to the coupling plate 25. The rotational amount of the head holder 110 about the pivot shaft 66 is adjusted by the adjusting screws 112A and 112B. The head holder 110 supports the pushing mechanism 80 through the cylinder 114 with a linear guide and makes it possible for the pushing mechanism 80 to move up and down relative to the lapping surface 2*a*. The head holder 110 supports the ceramic bar holder units 101A and 101B for holding both right and left end portions of the ceramic bar 92 independently of the pushing mechanism 80 and on both sides of the latter.

The head portion 21 is composed of the pushing mechanism 80 and the holder units 101A and 101B. The holder units 101A and 101B are composed of cylinders 102A and 102B fixed to the head holders 110A and 110B, sliders 103A and 103B driven by the cylinders 102A and 102B, respectively, and sensors 104A and 104B for measuring the drive amounts of the sliders 103A and 103B, respectively. These holder units 101A and 101B support the ceramic bar 92 at both end portions thereof independently of the pushing mechanism 80. Furthermore, the application of the excessive load is prevented by means of the vertical movement of the slider when the ceramic bar 92 is pushed against the lapping surface 2*a*.

Figure 13:
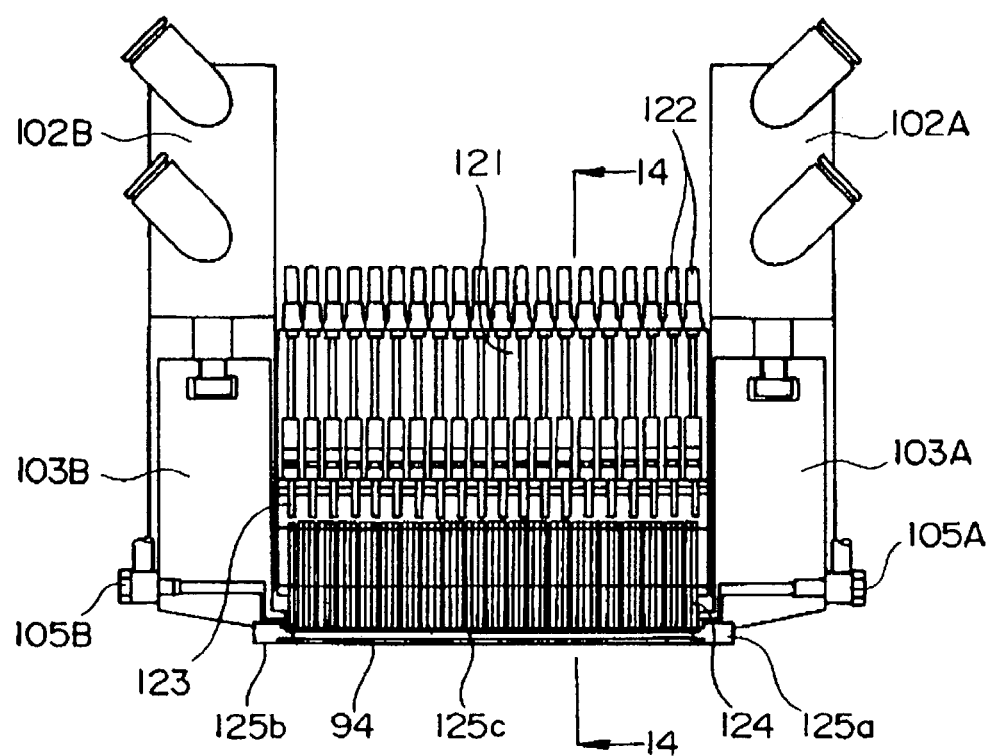
FIG. 13 is a frontal perspective view of a pushing mechanism 80 for an object to be polished.
Figure 14:
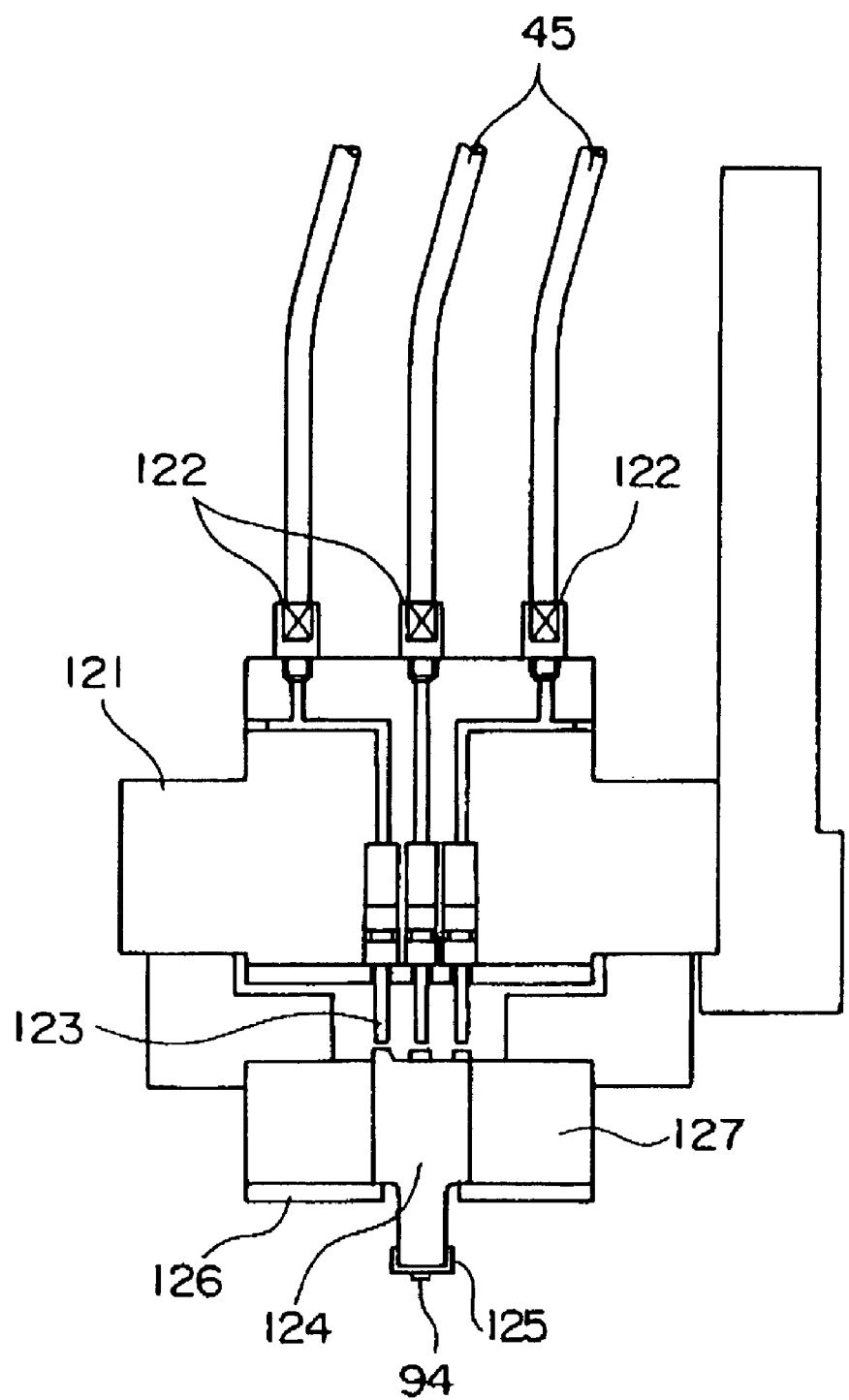
FIG. 14 is a cross-sectional view taken along the line 14—14 of FIG. 13.

The pushing mechanism 80 will now be described with reference to FIGS. 13 and 14. FIG. 13 is a frontal perspective view of the pushing mechanism 80 and FIG. 14 is a cross-sectional view taken along the line 14—14 of FIG. 13. In the pushing mechanism 80, the air fed from the electric pneumatic regulators 48 is introduced into a manifold cylinder 121 through joints 122 to thereby drive pistons 123 that are the actuators held within the manifold cylinder 121. The slider 124 is driven substantially up and down relative to the lapping surface 2*a* in response to the drive of the pistons 123. Note that, the drive range of the slider is limited by means of a stopper 126 and a guide 127.

Vacuum suction ports 105A and 105B are provided at lower end portions of the holder units 101A and 101B, respectively. At all the lower ends of a plurality of slider 124 arranged in parallel, rubber caps 125 for covering the ends of slider 124 from the surface 2a side are fixed with adhesives or the like. The rubber cap 125 holds the ceramic bar 92 that is the object to be lapped by the self viscous effect or a kind of vacuum suction effect in its surface (the surface directed to the lower portion of the paper surface in FIG. 13). Note that, in this embodiment, the rubber cap 125 is composed of suction portions 125a and 125b for supporting right and left end portions of the ceramic bar 92 by the suction ports in communication with the vacuum suction ports and fixed and sucked at respective predetermined position by the vacuum suction ports 105A and 105B, and the cap portion 125c for holding the back surface of the element formation portion of the ceramic bar 92. Note that, in this embodiment, the rubber cap 125 is composed of three parts but may be divided further in response to the rigidity of the material, the suction ability of the ceramic bar or the like and particularly the cap portion 125c may be divided into components corresponding to the respective sliders 124.

As described above, the ceramic bar 92 is held on the surface of the rubber cap 125 and is pushed against the lapping surface 2a to perform the crown machining. During machining, the plurality of sliders 124 are driven, respectively to impart the deformation to the rubber cap 125 to thereby deform the specific portion of the ceramic bar 92 or push strongly the specific portion of the ceramic bar 92 to the lapping surface 2a to thereby make it possible to increase the lapped amount of the specific portion of the ceramic bar 92. Note that, the slider 124 gives the deformation to the ceramic bar 94 through the rubber cap 125 that is made of elastic material but some percentage of the drive amount of the slider 124 is attenuated by the elastic deformation of the rubber cap 125. Accordingly, the drive amount of the slider 124, i.e., the drive amount of the piston 123 should be determined in view of the attenuation amount by the rubber cap 125.

In this embodiment, an object is to perform the above-described deformation by the slider 124 for each element formed on the ceramic bar. However, the size of the piston 123 that may provide the necessary drive amount of the slider 124, particularly, the diameter of the piston 123 is rather large in the current situation in comparison with the size of the region on the ceramic bar assigned to each element. For this reason, as shown in FIG. 14, the pistons 123 are arranged in three rows and the pistons 123 for driving the adjacent sliders 124 are arranged in different rows in order so that different pistons 123 are caused to correspond to the respective sliders 124. Accordingly, it is preferable that the arrangement of the pistons 123 according to this embodiment may be changed suitably in response to a size of the pistons 123 or the like.

With the above-described structure of the lapping apparatus for the crown machining, it is possible to perform the crown machining corresponding to each element on the ceramic bar for the ceramic bar that has been locally polished, and to reduce the non-uniformity in machining amount between the respective elements after the crown machining within the ceramic bar. Also, it is possible to perform the lapping machining such as crown machining without using any jig for holding the ceramic bar that is needed in the crown machining in the prior art.

Note that in the actual lapping process, since the ceramic bar 92 is pushed against the lapping surface 2a having the conical shape substantially a concave shape, it is necessary to hold the ceramic bar 92 in the somewhat tilted condition toward the spherical center of the lapping surface 2a along the lapping surface 2a. In this embodiment, this is done by rotating the head holder by means of adjusting screws 112A and 112B. However, it is possible to provide cylinders as described in the first embodiment. Namely, In order to cause the ceramic bar 92 to substantially face the lapping surface 2a, it is preferable to provide various mechanisms that may slant the lapping head 20 per se in advance from the vertical direction and can hold the ceramic bar 92.

Further, with respect to the rubber cap 125 which holds the ceramic bar, the material is not limited to rubber but if the material may hold the ceramic bar by the self viscous effect or the like and may be elastically deformed, the material may be used. Also, in order to accurately and positively hold the ceramic bar 92 by the rubber cap 125, a receiving groove (not shown) whose size is substantially the same as the ceramic bar 92 may be provided or machining such as forming a plurality of thin grooves for increasing the suction degree may be effected. Also, the rubber cap 125 is composed of the portions 125a to 125c. However, it may be composed of independent members corresponding to the holder units 101A and 101B and the pushing mechanism 80 and these members and the like may be driven independently of each other. In this case, it is unnecessary to use all the same material for the members 125a to c. For example, the members 125a and b are made of resin so that the ceramic bar 92 may be more firmly held. Only the member 125c may be made of elastic material. In case of this structure, for example, it is preferable that the holder units 101A and B are first driven together. The ceramic bar 92 is firmly held to the lapping surface 2a by the members 125a and b made of resin. Thereafter, the pushing mechanism 80 pushes the ceramic bar 92 through the rubber cap 125c. Note that, in this case, the resin is exemplified. However, if the material is not charged with unnecessary magnetic polarity and may prevent the charge of the element on the ceramic bar, it is possible to use various kind of material such as non-magnetic metal.

Further, in this embodiment, the piston 123 imparts the deformation to the rubber cap 125 through the slider 124. However, the present invention is not limited to this embodiment. For example, in the case where the diameter of the piston 123 or the air cylinder used instead thereof or the like is sufficiently small, it is possible to take a structure in which the deformation is given from the piston 123 directly to the rubber cap 125. In the present embodiment, since the ceramic bar 92 is held to the apparatus through the insulating member such as rubber or the like, there is a possibility that static electricity would be accumulated on the element or the like upon lapping to cause damage of the element. For this reason, it is preferable that carbon powder or the like is contained in the above-described resin or the elastic material or the like to impart the conductivity to each element.

Furthermore, in the present embodiment, the piston or cylinder driven by the air is used because of the easiness of handling as an actuator. However, the driving medium is not limited to the air. The control system is not limited to the above-described electric pneumatic regulator. It is possible to use liquefied material for the driving medium. It is also possible to use a simple air regulator or the like for the control system. Furthermore, a micro actuator made of piezoelectric elements or the like may be used instead of the cylinder. Also, in this embodiment, the lapping head may be driven only in X and Z axis directions. The present invention is not limited to this embodiment. For example, it is possible to take a structure in which the head may be moved in the Y axis direction so that the lapping head may be driven on a flat plane substantially in parallel with the lapping surface 2a. Also, it is possible to take a structure in which the head may be rotated in this XY plane.

In the first and second embodiments described above, the control of the lapping amount has not been described especially but as disclosed in Japanese Patent Application No. 11-302305 by the present applicant of the present application, it is possible to effect the control of the lapping amount by a closed loop for performing the lapping process while measuring in order, for example, the MR value or the like of each element. Furthermore, in the first and second embodiments, the lapping apparatus when the crown machining is effected to the ceramic bar has been described. However, the present invention is not limited thereto. For example, it is possible to use the lapping apparatus for the adjustment of the throat height or the like while making the lapping surface 2a flat.

INDUSTRIAL APPLICABILITY

In the lapping apparatus and the lapping method according to the present invention, it is possible to impart the complicated bent deformation or the like in accordance with the positional displacement that is caused when the electric-magnetic converting elements or the like are formed in case of crown machining being effected to the object to be lapped such as a ceramic bar, and to effect the crown machining in view of the positional displacement of the electric-magnetic converting elements or the like in case of crown machining.

Also, in the lapping apparatus and the lapping method according to the present invention, it is possible to dispense with the expensive jig. Accordingly, the present invention may be applied not only to the crown machining but also to various lapping steps to thereby make it possible to reduce the cost expended in the lapping steps.

What is claimed is:

1. A lapping apparatus for lapping an object to be lapped and elongated in one direction, in which a plurality of elements including at least one of an electric-magnetic converting element and a magnetic-electric converting element are formed in the longitudinal direction, comprising a lapping table drivingly rotated with a lapping surface, a lapping head mounting frame disposed movably relative to said lapping surface, and a lapping head supported by said lapping head mounting frame,
wherein said lapping head comprises a holder portion extending in the longitudinal direction and made of elastic material for holding said object to be lapped at a predetermined position on a surface without adhesive material, an elevating portion for supporting said holder portion and moving up and down integrally with said holder portion relative to said lapping surface, and a plurality of holder portion deforming means for directly imparting load for deforming said object to be lapped together with said holder portion to a back surface of said holder portion.

2. An apparatus according to claim 1, wherein said holder portion deforming means are disposed on the back surface of said holder portion and have a plurality of actuators for imparting the load to said holder portion.

3. An apparatus according to claim 2, further comprising a second holder portion for holding only both end portions of said object to be lapped and which may be driven independently of said holder portion.

4. An apparatus according to claim 3, wherein said second holder portion holds the object to be lapped through a member made of non-magnetic and conductive material such as resin.

5. An apparatus according to claim 2, wherein said holder portion deforming means have a transmission member in conformity with each of the plurality of actuators and said actuators impart the load to said holder portion through said transmission member.

6. An apparatus according to claim 5, wherein the plurality of actuators are arranged in a plurality of rows extending in the longitudinal direction, and the actuators are not aligned with each other in a direction perpendicular to the longitudinal direction in the adjacent rows.

7. A lapping apparatus for lapping an object to be lapped and elongated in one direction, in which a plurality of elements including at least one of an electric-magnetic converting element and a magnetic-electric converting element are formed in the longitudinal direction, comprising a lapping table drivingly rotated with a lapping surface, a lapping head mounting frame disposed movably relative to said lapping surface, and a lapping head supported by said lapping head mounting frame,
wherein said lapping head comprises a holder portion extending in the longitudinal direction and made of elastic material for holding said object to be lapped at a predetermined position on a surface without adhesive material, an elevating portion for supporting said holder portion and moving up and down integrally with said holder portion relative to said lapping surface, and a plurality of holder portion deforming means for directly imparting load for deforming said object to be lapped together with said holder portion to a back surface of said holder portion, and
said lapping surface constitutes a part of a spherical surface having a predetermined radius of curvature.

8. A lapping apparatus for lapping an object to be lapped and elongated in one direction, in which a plurality of elements including at least one of an electric-magnetic converting element and a magnetic-electric converting element are formed in the longitudinal direction, comprising a lapping table drivingly rotated with a lapping surface, a lapping head mounting frame disposed movably relative to said lapping surface, and a lapping head supported by said lapping head mounting frame,
wherein said lapping head comprises a holder portion extending in the longitudinal direction and made of elastic material for holding said object to be lapped at a predetermined position on a surface without adhesive material, an elevating portion for supporting said holder portion and moving up and down integrally with said holder portion relative to said lapping surface, and a plurality of holder portion deforming means for directly imparting load for deforming said object to be lapped together with said holder portion to a back surface of said holder portion, and
said holder portion deforming means have a second elastic member having a flexible comb-shaped portion, and a plurality of actuators flexing comb teeth of the comb-shaped portion independently of each other, wherein a specific portion of said comb teeth is arranged on said back surface of said holder portion, and said comb-shaped portion is flexed to impart the load to said holder portion.

9. An apparatus according to claim 8, wherein said second elastic member is made of a metal plate and said specific portion is a tip end of said comb tooth.

10. An apparatus according to claim 9, wherein said plurality of actuators are arranged into a plurality of rows extending in the longitudinal direction, and the actuators are not aligned with each other in a direction perpendicular to the longitudinal direction in the adjacent rows.

11. An apparatus according to claim 10, wherein said second elastic members are used as a pair, said comb tooth portions thereof face each other, and the tip end of one of the comb tooth ends is disposed between the tip ends of the other comb tooth end.

12. An apparatus according to any one of claims 1 to 6, wherein the elastic material constituting said holder portion includes rubber as the main material.

13. An apparatus according to any one of claims 8 to 6, wherein said actuators are driven by using a pressurized medium.

14. An apparatus according to any one of claims 1 to 6, wherein said holder portion deforming means are arranged to impart the load to a position in conformity with each of the plurality of elements in said holder portion.

15. A lapping method for lapping an object to be lapped and elongated in one direction, in which a plurality of elements including at least one of an electric-magnetic converting element and a magnetic-electric converting element are formed in the longitudinal direction, comprising the following steps of:
   holding said object to be lapped on a surface of an elastic member without adhesive materials, depressing said object to be lapped substantially uniformly in the longitudinal direction through said elastic member to a lapping surface constituting a part of a spherical surface having a predetermined radius of curvature formed on a lapping plate drivingly rotated and lapping said object to be lapped,
   wherein when said object to be lapped is depressed substantially uniformly to said lapping surface, in addition to said substantially uniform depression, the load is applied, through said elastic member, at a plurality of points to said object to be lapped by directly supplying a plurality of deformation loads onto the back surface of said elastic member.

16. A method according to claim 15, wherein the load imposed at the plurality of points is controlled in response to a measurement result obtained by measuring characteristics of the elements formed on said object to be polished.

17. A method according to claim 15 or 16, wherein the plurality of points at which the load is imposed correspond to the respective elements formed on said object to be polished.

18. A lapping method for lapping an object to be lapped and elongated in one direction, in which a plurality of elements including at least one of an electric-magnetic converting element and a magnetic-electric converting element are formed in the longitudinal direction, comprising the following steps of:
   holding said object to be lapped on a surface of an elastic member without adhesive material, depressing said object to be lapped substantially uniformly in the longitudinal direction through said elastic member to a lapping surface formed on a lapping plate drivingly rotated and lapping said object to be polished,
   wherein when said object to be lapped is depressed substantially uniformly to said lapping surface, in addition to said substantially uniform depression, the load is applied, through said elastic member, at a plurality of points to said object to be lapped by directly supplying a plurality of deformation loads onto a back surface of said elastic member.

19. A method according to claim 18, wherein before the step for holding said object to be lapped on the surface of the elastic member, a step for holding said object to be lapped at only both end portions of said object by a member made of resin so as to fix said object to be lapped at a predetermined position facing said lapping surface is performed.

* * * * *